July 2, 1968     J. R. UHEN     3,390,778
TWO-STAGE, TWIST-ON TYPE FILTER ASSEMBLY
Filed March 11, 1966
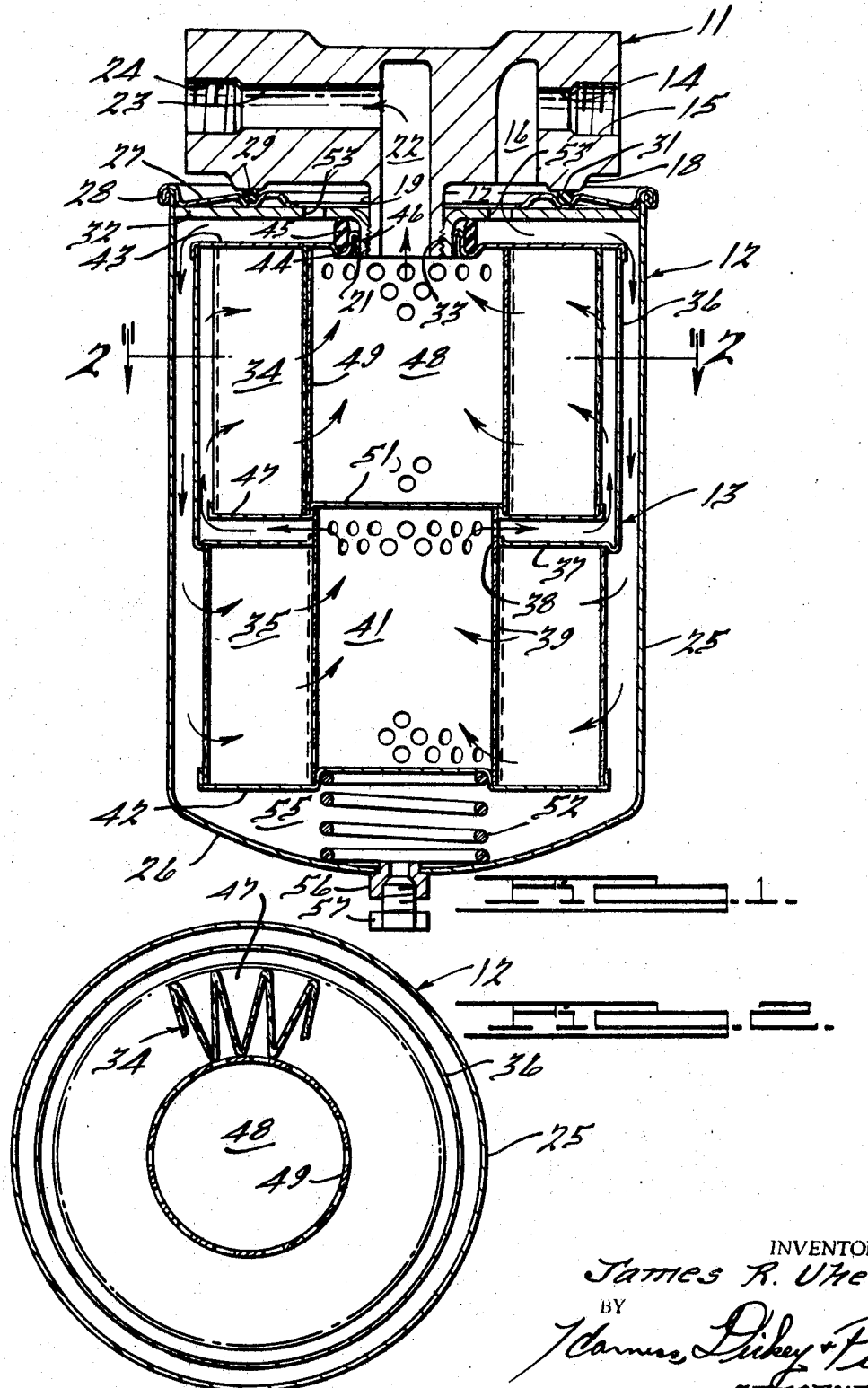
INVENTOR.
James R. Uhen
BY
ATTORNEYS.

United States Patent Office 3,390,778
Patented July 2, 1968

3,390,778
TWO-STAGE, TWIST-ON TYPE FILTER ASSEMBLY
James R. Uhen, Burlington, Wis., assignor to Walker Manufacturing Company, a corporation of Delaware
Filed Mar. 11, 1966, Ser. No. 533,520
2 Claims. (Cl. 210—314)

ABSTRACT OF THE DISCLOSURE

A two-stage throw-away type filter unit embodying first and second vertically stacked annular filter elements. The elements are disposed in series flow relationship with the lowermost element being adapted to separate water from a hydrocarbon that is also filtered by each of the elements.

This invention relates to a filter and more particularly to an improved, two-stage filter assembly.

In certain filter applications, the media serves the function of separating a foreign liquid from the fluid being filtered in addition to removing foreign particles from the fluid. It is most desirable, if not essential, that the removed foreign liquid be effectively separated from the fluid being filtered so that it cannot reenter the fluid stream or clog the passage of the fluid.

It is, therefore, a principal object of this invention to provide an improved filter assembly for removing foreign particles and foreign liquids from a fluid.

It is a further object of this invention to provide a filter assembly for separating water from oil.

It is an even further object of this invention to provide a filter assembly that removes water and foreign particles from oil.

A two-stage filter embodying this invention is adapted to remove foreign particles and a different density foreign liquid from a fluid. The filter comprises housing means defining a fluid inlet, a fluid outlet and a filtering chamber between the inlet and the outlet. A first filter media for separating different density foreign liquids from the filter and a second filter for filtering the foreign particles from the fluid are supported within the filtering chamber. The filter media are disposed in vertically stacked relationship with respect to the housing with the first filter media being disposed in close proximity to the portion of the chamber where the different density foreign liquid separated from the fluid tends to accumulate due to its difference in density for more rapid liquid separation.

The use of two-stage filter assemblies is well known. In two-stage filters, one of the filters may remove larger particles or different types of material from the fluid being filtered than the other stage. It is desirable to insure full flow of the fluid being filtered through both of the media in certain applications. This necessitates a series flow of the fluid through the media. Annular filter elements are most desirable in that they offer a relatively large surface area for a given volume. It is, however, difficult to obtain series flow through a pair of annular elements in certain spacial environments.

It is, therefore, another object of this invention to provide an improved series flow two-stage filter.

It is yet another object of the invention to provide an improved series flow two-stage filter wherein at least one of the filter elements is of the annular type.

It is a still further object of the invention to provide an improved series flow filter wherein each of the filter stages is comprised of an annular filter media.

A two-stage filter embodying these features of the invention is comprised of housing means defining an imperforate shell enclosing a filtering cavity. First and second fluid passages are formed in the shell for fluid communication with the filtering cavity. A first filter media is supported within the filtering cavity and interposed in the path of flow between the fluid passages. A second annular filter media is disposed externally of the filter cavity and has one end of its central flow passage in sealing engagement around its periphery with the second fluid passage of the shell. Means form an imperforate closure at the other end of the central passage of the second media for radial flow through the second media and series flow through the first and second media.

Other objects and advantages of this invention will become more apparent as this description proceeds, particularly when considered in conjunction with the accompanying drawings, wherein:

FIGURE 1 is a cross sectional view of a filter assembly embodying this invention; and FIGURE 2 is a cross sectional view taken along the line 2—2 of FIGURE 1.

Referring now in detail to the drawings, a filter assembly embodying this invention is shown in longitudinal cross section in FIGURE 1 and is comprised of a base 11 and a throwaway type filter cartridge 12 in which a filter assembly 13 embodying this invention is contained.

The base 11 is formed with a fluid inlet passage 14 having a tapped opening 15 for attachment to a supply line of the fluid to be filtered, for example, the oil fuel line of a diesel engine. The fluid inlet passage 14 intersects a vertically extending passage 16 that terminates in an annular cavity 17 defined by a raised annular rib 18 formed in the lower face of the base 11. Centrally disposed within the cavity 17 and extending axially beyond the rib 18 is a connecting nipple 19 having a screw threaded outer periphery 21. A fluid outlet passage 22 is formed concentrically in the connecting nipple 19 and is intersected at its upper end by a fluid discharge passage 23. A tapped hole 24 is formed at the outer end of the passage 23 for connection to the fuel supply line of the engine.

The filter cartridge 12 is comprised of an outer shell having a generally cylindrical sheet metal wall 25 closed at one end by an integral dome shaped end wall 26. The opposite end of the cylindrical wall 25 is closed by means of a sheet metal end plate 27 that is affixed to the cylindrical wall 25 around its periphery by a rolled-over lock seam 28. An annular groove 29 is formed in the end plate 27 for containing a sealing gasket 31 that sealingly engages the lower base annular rib 18 to form a fluid tight enclosure for the cavity 17. A more rigid backing plate 32 is contained within the filter shell adjacent the end plate 27. A tapped hole 33 is formed centrally in the backing plate 32 for providing a screw threaded connection of the filter cartridge 12 onto nipple 19 of the base 11.

The filter assembly 13 contained within the filter cartridge 12 is comprised of first and second annular pleated paper filter media 34 and 35, respectively. The first media 34 is less porous and hence will exclude a smaller sized particle than the second media 35. In addition the media 35 is treated with a suitable silicone material so that it will be substantially impervious to water. Thus, any water contained in the fuel oil flowing to the engine will not pass through the second filter media 35.

A generally cylindrical imperforate sheet metal wall 36 encircles the media 34 and extends from a point below its lower end to a point adjacent its upper end. The cylindrical wall 36 is disposed radially outwardly of the outer pleats of the media 34 and its lower end is closed by an integral end wall 37. The end wall 37 is formed with a central opening 38 through which a perforate center tube 39 of the second filter media 35 extends. The center tube 39 extends axially beyond the end wall 37 into a filtering chamber defined by the cylindrical shell 36 and in which the filter media 34 is contained. The lower end of the filter media 35 and a central fluid passage 41 formed by its center tube 39 is closed by an impervious end wall 42. Thus, fluid must flow radially through the media 35.

The upper end of the first filter media 34 and the upper end of the cylindrical wall 36 are closed by an imperforate enclosure 43 that forms an annular groove 44 in which a gasket 45 is constrained. The gasket 45 engages the backing plate 32 and end plate 43 around the nipple 19 so as to preclude any fluid leakage through a central opening 46 formed in the end plate 43. The lower end of the filter media 34 is closed by an imperforate wall 47 that also extends across a central fluid passage 48 formed by a perforate center tube 49 of the filter media 34. The end closure 47 is formed with a cup-shaped central portion 51 that extends into the lower end of the central opening 48 and supportingly engages the upper end of the center tube 39 of the second filter media 35.

A coil spring 52 bears against the filter cartridge outer shell end wall 26 and the end closure 42 of the filter cartridge 35 to maintain sealing pressure upon the gasket 45. Fluid entering the filter assembly through the base inlet passages 14, 16 and cavity 17, flows into the interior of the filter cartridge through a plurality of circumferentially spaced oil inlet holes 53 formed in the end plate 27 and backing plate 32. Due to the seal 45 and the imperforate shell formed by the end closure 43, cylindrical shell 36 and end closure 37 which surrounds the first filter media 34, the fuel oil is directed first to the second filter media 35. The media 35, which has been noted excludes coarser particles and water from the oil, will preclude the passage of these elements. The water that is separated due to its higher density than the oil will immediately pass to the bottom of the filter cartridge outer shell in the area designated by the reference numeral 55. Thus, the close proximity of the water excluding media 35 to the portion of the filter cartridge where the water gravitates will insure rapid removal of the water. The accumulated water and foreign particles may be periodically drained from the filter cartridge 12 through a drain plug 56 having a central opening closed by a plug 57.

After the oil flows radially inwardly through the filter media 35 it travels axially upwardly through the central passage 41 defined by the center tube 39. The oil then flows into the filtering cavity wherein the filter media 34 is contained through the perforations formed in the portion of the inner shell 39 that extends through the end wall 37. The oil then passes radially inwardly through the first filter media 34 wherein smaller size particles are excluded. The twice filtered oil then passes into the central passage 48 of the first filter media 34 for return to the engine fuel system through the base passages 22 and 23.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A two-stage throw-away type filter comprising housing means defining a filtering cavity, means forming a fluid inlet passage in said housing means in fluid registry with said filtering cavity, means forming a fluid outlet passage in said housing means in registry with said filtering cavity, a first generally annular filter element supported within said filtering cavity, said first filter element defining a central flow passage, means forming a first end closure for one end of said first filter element and for the adjacent end of said central flow passage of said first filter element, said first end closure means for said first filter element defining a depressed cylindrical portion extending into said adjacent end of said central flow passage of said first filter element, means forming a second end closure for the other end of said first filter element, means providing a seal between said second end closure of said first filter element and said housing around said fluid outlet passage for fluid communication between the other end of said central flow passage of said first filter element and said fluid outlet passage, said second end closure means of said first filter element extending radially outwardly of the outer periphery of said first filter element, an imperforate shell having a cylindrical portion in sealing engagement at one end thereof with said second end closure means of said first filter element, said cylindrical portion of said shell being disposed radially outwardly of the outer periphery of said first filter element and extending axially beyond said first end closure means of said first filter element, a second substantially annular filter element disposed within said filtering chamber, said second filter element having a central flow passage, said central flow passage being defined at least in part by a perforate tube, said shell having a radially inwardly extending portion at the other end of said cylindrical portion, one end of said second filter element being in sealing engagement with said radially inwardly extending portion of said shell whereby said radially inwardly extending portion forms an end closure for said one end of said second filter element, said perforate tube extending through said radially inwardly extending portion of said shell and into said depressed cylindrical portion of said first end closure of said first filter element for radially locating said perforate tube relative to said first filter element and for providing fluid communication with the space between said shell and the outer periphery of said first filter element for fluid communication between said central flow passage of said second filter element and said outer periphery of said first filter element, and means forming an end closure for the other end of said second filter element and for the other end of said central flow passage of said second filter element, the outer periphery of said second filter element being in direct fluid communication with said fluid inlet passage for series fluid flow through said first filter element and through said second filter element in that order.

2. A two-stage throw-away type filter as set forth in claim 1 wherein the second filter element is treated to preclude the passage of water therethrough for separating water from the filtered fluid.

References Cited

UNITED STATES PATENTS

| 2,929,503 | 3/1960 | Ambruster et al. | 210—120 |
| 3,132,501 | 5/1964 | Jacobs et al. | 210—314 X |
| 3,144,407 | 8/1964 | Olmos | 210—335 X |

FOREIGN PATENTS

| 933,209 | 8/1963 | Great Britain. |

SAMIH N. ZAHARNA, *Primary Examiner.*

REUBEN FRIEDMAN, *Examiner.*

F. SPEAR, *Assistant Examiner.*